Patented Mar. 3, 1936

2,033,056

UNITED STATES PATENT OFFICE 2,033,056

PRODUCTION OF ORGANIC ACIDS

Joseph Frederic Walker, Niagara Falls, N. Y., assignor to E. I. du Pont de Nemours & Company, Inc., Wilmington, Del., a corporation of Delaware No Drawing. Application August 27, 1934,
Serial No. 741,731

9 Claims. (Cl. 260—108)

This invention relates to the production of carboxylic acid derivatives of partially hydrogenated polycyclic aromatic hydrocarbons and more particularly to the production of such acids by simultaneously reacting the aforesaid hydrocarbon with alkali metal and carbon dioxide in a suitable solvent medium.

Carboxyl derivatives of partially hydrogenated polycyclic aromatic hydrocarbon may be prepared by reacting an alkali metal with polycyclic aromatic hydrocarbon in a suitable solvent medium to form an alkali metal hydrocarbon addition product and subsequently reacting said addition product with carbon dioxide to produce the alkali metal salt of the corresponding carboxyl derivative. For example, if naphthalene is reacted with sodium in this manner, a disodium naphthalene addition compound having the empirical formula $C_{10}H_8Na_2$ is formed. This addition product is soluble in the solvent medium in which it is formed, causing a green color therein. Similar alkali metal addition compounds of other polycyclic aromatic hydrocarbons may be formed by substantially the same treatment; all these addition products are more or less soluble in the solvent mediums used and their presence is indicated by a distinct coloration of the solvent. If the colored solution of the alkali metal addition compound is treated with carbon dioxide, the color is discharged and the sodium salt of the corresponding carboxyl derivative is precipitated. For example, when disodium naphthalene ($C_{10}H_8Na_2$) is reacted with carbon dioxide, the product is an isomeric mixture of the sodium salts of acids having the formula $C_{10}H_8(COOH)_2$. This acid, which may be termed "dihydronaphthalene dicarboxylic acid", is the dicarboxyl derivative of dihydronaphthalene. It probably occurs in two isomeric forms which may be represented by the graphic formulæ:

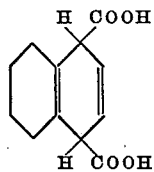 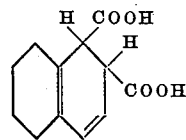

The free acid may be recovered by filtering off the sodium salts and treating them with a suitable strong acid, e.g., hydrochloric or sulfuric acid. The various polycyclic aromatic hydrocarbons are suitable for carrying out these reactions, for example naphthalene, diphenyl, phenanthrene, anthracene and others, to produce similar carboxyl derivatives.

The formation of the alkali metal addition compounds of the polycyclic aromatic hydrocarbons is described by Schlenk, Liebig's Annalen, volume 463, pages 90 to 95. The methods of carrying out these reactions using certain ingredients as solvent media which facilitate the reaction of sodium and other alkali metal hydrocarbons is described in tthe copending U. S. patent application by Norman D. Scott, Serial Number 638,524. The Scott application also describes an improved method of preparing the carboxyl derivatives which comprises simultaneously reacting the hydrocarbon with sodium and treating the reaction mixture with carbon dioxide during the course of the sodium reaction, so that the sodium compound is carboxylated substantially as it is formed. In this method, care is taken that the rate of addition of carbon dioxide is not sufficiently great to discharge the color imparted to the reaction mixture by the alkali metal addition compound. It was found that if sufficient carbon dioxide was added to discharge the color, the sodium tended to react directly therewith, to form a layer of carbonate on the metal, which inhibited or stopped the entire reaction.

An object of this invention is to provide an improved method for producing carboxyl derivatives of partially hydrogenated polycyclic aromatic hydrocarbon by a method comprising reacting alkali metal with such hydrocarbon while simultaneously introducing carbon dioxide into the reaction mixture to produce the sodium salts of the carboxyl derivatives. Other objects will be hereinafter apparent.

The above objects are attained by reacting alkali metal with a polycyclic aromatic hydrocarbon in a suitable solvent medium to form the alkali metal addition compound and, as soon as this addition reaction is started, introducing carbon dioxide gas into the reactive mixture at a rate sufficient to substantially completely discharge the color of the addition compound at least throughout the bulk of the reactive mixture and to maintain at least the bulk of the reactive mixture in a colorless condition until the reaction of the alkali metal is complete. Whereas in the above described Scott method of preparing the carboxyl derivatives by simultaneous alkali metal reaction and carboxylation, such rate of carbon dioxide introduction is maintained that the color is not discharged, in order to prevent the formation of carbonate on the surface of the alkali metal, I have found that the rate of $CO_2$ addition may be maintained at such rate that the color is substantially completely discharged throughout the reaction without in any way inhibiting the rate of reaction of the alkali metal, provided that the rate of $CO_2$ addition is not sufficiently great to completely discharge the color on the surface of the metal. I have found that my herein described method results in higher yields than are obtained when the carboxylation is carried out under such conditions that the color of the reaction mixture is not discharged.

In one method of practicing my invention, a polycyclic aromatic hydrocarbon is dissolved in a suitable solvent medium and reacted therein preferably under anhydrous non-oxidizing conditions with sodium or other alkali metal. As shown by the work of Schlenk above referred to, diethyl ether may be used as a solvent for the alkali metal hydrocarbon reaction, especially if the alkali metal is lithium. However, especially if sodium is to be used as the alkali metal, some special ether solvent must be used as solvent, for example one of those used as described and claimed in the above mentioned Scott application, in order that the reaction may proceed at a reasonable rate. Such ethers include aliphatic mono-ethers such as dimethyl ether, methylethyl ether, methyl normal propyl ether or methyl iso-propyl ether; aliphatic di-ethers, such as methylal, glycol dimethyl ether and various cyclic ethers such as glycol formal or dioxan and other polyethers, e. g., glycerol trimethyl ether and the like. Each of these ethers may be used alone or in combination with one or more of the others as solvent media or a solvent medium may be made up by mixing a suitable amount of one of these ethers with other ethers or other organic solvents which are not incompatible with the reacting materials. The reaction is preferably carried out under conditions which prevent access of material amounts of moisture or oxygen to the alkali metal. For the best results, it is more or less essential that the surface of the alkali metal, or at least a part of the surface, be free from foreign material. It is not necessary that the sodium be finely divided before introducing to the reactive mixture but a finely divided metal may be used if desired. The reaction occurs at low temperatures as well as at temperatures above the melting point of the alkali metal. As indicated hereinafter, I have found that extremely low temperatures usually are beneficial.

The commencement of the reaction between the alkali metal and the hydrocarbon is indicated by the distinct coloration, usually greenish, formed throughout the reactive solvent caused by the presence of the alkali metal hydrocarbon addition compound. In accordance with my invention, as soon as the formation of the color is observed, the introduction of carbon dioxide is commenced and is maintained at such rate that at least the bulk of the reaction mixture is maintained in a substantially colorless condition, taking care, however, that the rate of carbon dioxide introduction is not great enough to discharge the color on the surface of the reacting metal. The introduction of the carbon dioxide is continued until the reaction between the sodium and the hydrocarbon is substantially complete. The net result is the continuous formation of a precipitate of the sodium salts of the isomeric carboxyl derivatives. After the reaction has been completed, the solution may be filtered to remove the aforesaid sodium salts and the latter may be reacted with a suitable strong acid to produce the free carboxyl derivatives.

It is of course possible to add the carbon dioxide at such rate that sufficient carbonate will be formed on the surface of the alkali metal so as to stop the desired reaction. If this occurs the reaction often may be started again by either adding fresh alkali metal or by scraping the surface of the alkali metal to present a clean surface to the reaction solution. However, it is preferable to maintain the rate of carbon dioxide addition below that which will inhibit or stop the reaction of the alkali metal. Accordingly, I prefer to add the $CO_2$ at a rate not greater than that required for substantially complete decoloration of the entire reaction mixture, while leaving the surface of the reacting metal colored. In other words, the rate of carbon dioxide addition in accordance with my invention lies in the range between, on the one hand, the rate required for complete decoloration of the reaction liquid but not great enough to discharge the color on the surface of the reacting metal and, on the other hand, a rate sufficient to decolorize the bulk of the reaction mixture, but allowing a small amount of coloration to occur in the neighborhood of the surface of the alkali metal undergoing reaction. I have found that by operating in this range, there is substantially no formation of alkali metal carbonate as long as there is available hydrocarbon to react with the metal. My invention also contemplates intermittent as well as continuous introduction of the carbon dioxide; however I prefer to add the carbon dioxide at a continuous steady rate because it results in greater ease in control and also usually results in higher yields of the desired products. If the carbon dioxide is added intermittently, there is likely to be times during the course of the reaction that the entire mixture will become momentarily colored; I prefer to avoid such appearances of coloration throughout the reaction mixture, for I have found that they are invariably associated with lowered yields of the product.

I have further discovered that high yields are favored by the use of extremely low reaction temperatures, viz., reaction temperatures below about −30° C., preferably in the neighborhood of −50 to −80° C. Such temperatures may easily be obtained by known means for example by using solid carbon dioxide as cooling agent. For such low temperature operations, the solvent employed must be one which will not become too viscous at the reaction temperature and in which the reaction between the hydrocarbon and the alkali metal will not proceed too slowly at the low temperatures. I have found that in general, the rate of reaction between the hydrocarbon and the alkali metal tends to become slower as the temperature is lowered, but this effect varies considerably, depending on the ether used as reaction solvent. For example, with dimethyl glycol ether as solvent, the reaction proceeds at a good rate at temperatures of −10° C. or higher, but below −10° C., the rate of reaction tends to decrease rapidly as the temperature is lowered. On the other hand, with dimethyl ether or methyl ethyl ether as solvent, the rate of reaction does not appreciably diminish until the temperature is lowered to around −60° C. Since the lower temperatures favor higher yields of the acidic products, I prefer to operate at the lowest possible temperature which will permit a reasonable reaction rate with the ether solvent in use.

The following examples illustrate specific methods of practicing my invention:

EXAMPLE 1

*Preparation of salts of dihydronaphthalene dicarboxylic acids*

In a 5 liter container, equipped with a mechanical agitator, was placed 2600 c. c. of pure, anhydrous dimethyl glycol ether and 256 grams of naphthalene. The apparatus was arranged so that nitrogen gas and carbon dioxide could be passed into the flask over the surface of the liquid and precautions were taken to prevent the entrance of air into the container. A thermometer also was introduced to read the temperature of the reacting liquids. A nitrogen atmosphere was then maintained over the naphthalene solution and the reaction mixture was cooled to −10° C. Approximately 30 grams of sodium cut in small sticks about one inch long was then added. After agitation for a short time, the surface of the sodium became green and green streamers began to spread through the solution. At this point, carbon dioxide was passed into the flask at a rate sufficient to keep the solution from becoming green but not fast enough to decolorize the green sodium surface from which short green streamers passed into the solution. The temperature of the reaction mixture was maintained between −5° and −10° C. The nitrogen stream was cut down in rate except when appearances such as whitening of the sodium surface indicated that an excess of carbon dioxide had been added; when this happened, the carbon dioxide addition was discontinued and the nitrogen rate correspondingly increased to prevent a negative pressure from developing in the reactor. When most of the added sodium had been consumed, additional sodium was added until 120 to 140 grams had been added; (the theoretical amount of sodium required for reaction with the naphthalene used was 92 grams). When the rate of reaction became exceedingly slow, an excess of carbon dioxide was added to "kill" the reaction and the unreacted sodium was extracted with a forceps and cleaned and weighed. The sodium salts then were filtered from the reaction mixture and dried in vacuo at a temperature not exceeding 50° C., to remove solvent. The salts obtained in this manner contained about 10% naphthalene and about 80% of available dihydronaphthalene dicarboxylic acids. The other 10% consists mainly of sodium salts of a resinous acid byproduct and possibly also some sodium carbonate. The crude salts had the appearance of a dry white powder.

EXAMPLE 2

*Preparation of salts of dihydronaphthalene dicarboxylic acids*

The apparatus, materials, and procedure followed in this preparation were essentially the same as those employed in Example 1, except that dimethyl ether, a liquid boiling at −24.5° C. was used in place of dimethylglycol ether as a solvent and the reaction temperature was maintained at −55° to −45° C. When the reaction had been concluded, the dimethyl ether was allowed to boil off and the crude salts were left behind in the reaction vessel.

EXAMPLE 3

*Preparation of salts of dihydrodiphenyl dicarboxylic acids*

Two moles of diphenyl (308 grams) was dissolved in 1500 c. c. of dimethyl ether in a reactor of the sort described in Example 1. Sodium then was added and when the formation of sodium diphenyl was observed to commence, carbon dioxide was added in the same manner as described in the above examples. The reaction temperature was maintained in the neighborhood of −50° C. When the reaction rate became slow, the reaction was "killed" with excess of carbon dioxide and the dimethyl ether was allowed to evaporate, leaving the sodium salts of the dihydrodiphenyl dicarboxylic acids in the reaction vessel.

I claim:

1. A method for preparing a carboxyl derivative of a partially hydrogenated polycyclic aromatic hydrocarbon comprising reacting a polycyclic aromatic hydrocarbon with an alkali metal in a solvent and simultaneously adding carbon dioxide to the reaction mixture at such rate that the formation of color in the solvent is substantially continuously discharged throughout the bulk of the reaction solution without discharging said color in close proximity to the surface of the reacting alkali metal.

2. A method for preparing a carboxyl derivative of a partially hydrogenated polycyclic aromatic hydrocarbon comprising reacting a polycyclic aromatic hydrocarbon with an alkali metal in a solvent and simultaneously adding carbon dioxide to the reaction mixture at a rate at least sufficient to discharge and prevent the appearance of color throughout the bulk of the reaction solution but not sufficiently great to prevent the alkali metal from further reacting with the hydrocarbon.

3. A method for preparing a dicarboxyl derivative of a partially hydrogenated polycyclic aromatic hydrocarbon comprising reacting a polycyclic aromatic hydrocarbon with an alkali metal in a solvent and simultaneously adding carbon dioxide to the reaction mixture at a rate not greater than that required for complete discharge of color on the surface of the alkali metal and not less than that required to substantially continuously maintain the bulk of the reaction mixture in a substantially colorless condition.

4. A method for preparing a dicarboxyl derivative of a partially hydrogenated polycyclic aromatic hydrocarbon comprising reacting a polycyclic aromatic hydrocarbon dissolved in an ether with an alkali metal at a temperature below −30° C. and simultaneously adding carbon dioxide to the reaction mixture at a rate not greater than that required for complete discharge of color on the surface of the alkali metal and not less than that required to substantially continuously maintain the bulk of the reaction mixture in a substantially colorless condition.

5. A method for preparing a dicarboxyl derivative of a partially hydrogenated polycyclic aromatic hydrocarbon comprising reacting a polycyclic aromatic hydrocarbon dissolved in an ether with an alkali metal at a temperature of −50 to −80° C. and simultaneously adding carbon dioxide to the reaction mixture at a rate not greater than that required for complete discharge of color on the surface of the alkali metal and not less than that required to substantially continuously maintain the bulk of the reaction mixture in a substantially colorless condition.

6. A method for preparing dihydronaphthalene dicarboxylic acid comprising reacting naphthalene dissolved in an ether with sodium and simultaneously adding carbon dioxide to the reaction mixture at such rate that the formation of color in the ether solvent is substantially continuously discharged throughout the bulk of the reaction solution without discharging said color in close proximity to the surface of the reacting sodium.

7. A method for preparing dihydronaphthalene dicarboxylic acid comprising reacting naphthalene with sodium in dimethyl ether at a temperature of −50 to −80° C. and simultaneously adding carbon dioxide to the reaction mixture at a rate not greater than that required for complete discharge of color in the reaction solution and not less than that required to substantially continuously maintain the bulk of the reaction mixture in a substantially colorless condition.

8. A method for preparing a dicarboxy derivative of a dihydro derivative of a polycyclic aromatic hydrocarbon comprising reacting sodium with said hydrocarbon in a solvent comprising an ether selected from the group consisting of dimethyl ether, methyl ethyl ether, methyl propyl ethers, aliphatic polyethers and cyclic ethers and simultaneously adding carbon dioxide to the reaction mixture at a rate not greater than that required for complete discharge of color on the surface of the sodium and not less than that required to substantially continuously maintain the bulk of the reaction mixture in a substantially colorless condition.

9. A method for preparing dihydronaphthalene dicarboxylic acid comprising reacting sodium with naphthalene in a solvent comprising an ether selected from the group consisting of dimethyl ether, methyl ethyl ether, methyl propyl ethers, aliphatic polyethers and cyclic ethers and simultantously adding carbon dioxide to the reaction mixture at a rate not greater than that required for complete discharge of color on the surface of the sodium and not less than that required to substantially continuously maintain the bulk of the reaction mixture in a substantially colorless condition.

JOSEPH FREDERIC WALKER.